(12) United States Patent
Underdahl

(10) Patent No.: US 6,937,138 B2
(45) Date of Patent: Aug. 30, 2005

(54) KEYLESS REMOTE DOOR LOCKING SYSTEM

(76) Inventor: Craig T. Underdahl, 2132 Rocky Creek Dr., Rochester, MN (US) 55906

( * ) Notice: Subject to any disclaimer, the term of this patent is extended or adjusted under 35 U.S.C. 154(b) by 702 days.

(21) Appl. No.: 10/105,209

(22) Filed: Mar. 25, 2002

(65) Prior Publication Data

US 2003/0179076 A1 Sep. 25, 2003

(51) Int. Cl.[7] ................................................. H04Q 9/00
(52) U.S. Cl. ....................... 340/5.64; 307/139; 307/10.1
(58) Field of Search ................................ 340/5.64, 5.5, 340/5.22, 5.28, 825.69, 5.3, 5.54, 5.72, 426.13, 426.28; 307/139, 147, 10.3, 10.6; 180/273, 279, 289; 70/257, 277

(56) References Cited

U.S. PATENT DOCUMENTS

| | | | |
|---|---|---|---|
| 4,881,148 A | 11/1989 | Lambropoulos et al. | 361/172 |
| 5,109,221 A | 4/1992 | Lambropoulos et al. | 340/5.22 |
| 5,113,182 A | 5/1992 | Suman et al. | 340/5.28 |
| 5,252,966 A | 10/1993 | Lambropoulos et al. | 340/5.64 |
| 5,278,547 A | 1/1994 | Suman et al. | 340/5.22 |
| 5,373,282 A * | 12/1994 | Carter | 340/5.3 |
| 5,406,274 A | 4/1995 | Lambropoulos et al. | 340/825.69 |
| 5,563,579 A | 10/1996 | Carter | 340/539.17 |
| 5,619,191 A | 4/1997 | Lambropoulos et al. | 340/5.22 |
| 5,774,064 A | 6/1998 | Lambropoulos et al. | 340/825.69 |
| 5,815,087 A | 9/1998 | Campbell et al. | 340/5.6 |
| 5,828,316 A * | 10/1998 | DiCroce | 340/825.69 |
| 5,864,297 A | 1/1999 | Sollestre et al. | 340/5.23 |
| 5,889,337 A * | 3/1999 | Ito et al. | 307/10.1 |
| 5,955,981 A | 9/1999 | Rangan | 341/173 |
| 6,028,537 A | 2/2000 | Suman et al. | 340/988 |
| 6,067,826 A * | 5/2000 | Holloway et al. | 70/278.3 |
| 6,166,460 A * | 12/2000 | Chutorash | 307/139 |
| 6,335,576 B1 | 1/2002 | Wallace | 340/10.2 |
| 6,429,773 B1 | 8/2002 | Schuyler | 340/425.5 |
| 6,718,240 B1 | 4/2004 | Suda et al. | 701/36 |
| 6,870,458 B2 * | 3/2005 | Caren | 340/5.22 |

* cited by examiner

Primary Examiner—Michael Horabik
Assistant Examiner—William Bangachon
(74) Attorney, Agent, or Firm—Bryan W. Bockhop; Bockhop & Associates, LLC

(57) ABSTRACT

An apparatus for controlling a door lock of a vehicle having an automatic door locking circuit includes a signal sensor and a removable control unit that is responsive to the signal sensor. The removable control unit generates a door lock state change signal when the signal sensor receives a signal having a first predetermined code value. A first controllable switch that is responsive to the removable control unit is removably couplable to the automatic door locking circuit. The first controllable switch is able to override the automatic door locking circuit so that when the door lock state change signal is asserted, the controllable switch applies power to the automatic door locking circuit, thereby causing a change of state of the door lock.

23 Claims, 2 Drawing Sheets

KEYLESS REMOTE DOOR LOCKING SYSTEM

BACKGROUND OF THE INVENTION

1. Field of the Invention

The invention relates to the field of vehicle control systems, and, more specifically, to a vehicle remote control system for controlling a plurality of vehicle locks simultaneously.

2. Description of the Prior Art

Automobile dealerships and other transportation related organizations, for example, must maintain a constant effort to prevent the theft of vehicles. Additionally, dealerships have a problem keeping up with the keys to the vehicles and supplying them for the respective vehicles when needed. Typically, the keys to a vehicle are kept in a common location of a dealership showroom or are kept at the vehicle in a local lockbox that is attached to the vehicle. There are several advantages to having the keys at the vehicle in terms of convenience for both the dealership staff and the customer. For example, a dealership is likely to make more sales if the keys can be kept at the vehicle, as prospective customers have less time to reconsider their buying decisions. Also, storing a plurality of keys in a common location to which several different people have regular access increases the likelihood that the keys will become disorganized.

The local lockbox approach also has several disadvantages. For example, a car thief can spray a refrigerant into the lock of the lockbox to make it brittle and then shatter the lock by striking it with a hammer. Also, if the keys necessary to open the local lockboxes are lost or stolen, then the security of the vehicles is compromised. Thus, if a dealership employee leaves the employ of the dealership without returning his lockbox keys, then every lock must be replaced at a considerable cost to the dealership. Furthermore, a local lockbox attached to a vehicle makes the vehicle look less attractive to the buyer, and may even damage the finish of the vehicle.

Some dealerships unlock all of the vehicles on the lot in the morning and then relock the vehicles at night. This allows potential buyers to examine the insides of the vehicles at will during normal business hours. However, unlocking every vehicle is a labor-intensive process that ties up a considerable amount of dealership staff time.

Many modern vehicles are equipped with remote door lock controls. The user is supplied with a remote transmitter that allows for locking and unlocking of vehicles at the press of a button. However, the use of existing remote devices does not overcome the difficulties experienced with dealerships because each remote transmitter must be tuned to respond to a unique code to prevent unauthorized access to the vehicles. Thus, the dealership staff must spend unnecessary overhead in organizing the remote transmitters.

Therefore, there is a need for a device that allows simultaneous remote locking and unlocking of a plurality of vehicles using a single transmitter.

SUMMARY OF THE INVENTION

The disadvantages of the prior art are overcome by the present invention which, in one aspect, is an apparatus for controlling a door lock of a vehicle having an automatic door locking circuit. The apparatus includes a signal sensor and a removable control unit that is responsive to the signal sensor. The removable control unit generates a door lock state change signal when the signal sensor receives a signal having a first predetermined code value. A first controllable switch that is responsive to the removable control unit is removably couplable to the automatic door locking circuit. The first controllable switch is able to override the automatic door locking circuit so that when the door lock state change signal is asserted, the controllable switch applies power to the automatic door locking circuit, thereby causing a change of state of the door lock.

In another aspect, the invention is an apparatus for controlling a door lock of each of a plurality of vehicles, each of which having an automatic door locking circuit. The apparatus includes a transmitter that is capable of transmitting a common predetermined code and a plurality of removable controllers. Each controller includes a signal sensor and a control circuit that overrides the automatic door locking circuit of each vehicle so as to be able to change a door lock state of the corresponding door lock upon sensing the common predetermined code from the transmitter.

In yet another aspect, the invention is a method of controlling door lock state of a plurality of vehicles in which each of the plurality of vehicles includes a door lock control unit that controls a door lock. Each of a plurality of removable control units is coupled to a corresponding door lock control unit of each of the plurality of vehicles so that each control unit is capable of causing a state change of the door lock of a corresponding vehicle upon sensing a predetermined code. The predetermined code of each control unit is configured to a single common code. A transmitter is programmed to generate the single common code upon receiving an input from a user.

In yet another aspect, the invention is a method in which on an automobile sales lot, vehicles are parked for sale, wherein the automobiles each include an electronic door locking system. The electronic door locking systems of each of the vehicles for sale is adapted so that each of the systems is responsive to a wireless signal that causes the door locking system to open at least one door of the vehicle. A wireless transmitter is used to generate the wireless signal to open the door of a vehicle. The same wireless transmitter and wireless signal can be used to open a door of a plurality of the vehicles.

In yet another aspect, the invention is an apparatus that includes an electronic device to be located in a vehicle to receive a wireless signal and generate control signals to an automobile door lock and ignition system. The control signals cause at least one door to open and the ignition system to switch from a disabled state to an enabled state. In the disabled state, a key for the vehicle does not work to start the vehicle and in an enabled state, a key for the vehicle operates to start the vehicle.

In yet another aspect, the invention is a vehicle that includes an ignition system, a door locking system, a vehicle key that is used to open a door of the vehicle and start the vehicle with the ignition system and an electronic device that is coupled to the ignition system and the door locking system. The electronic device is responsive to a wireless signal and generates control signals to cause at least one door to open and the ignition system to switch from a disabled state to an enabled state.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
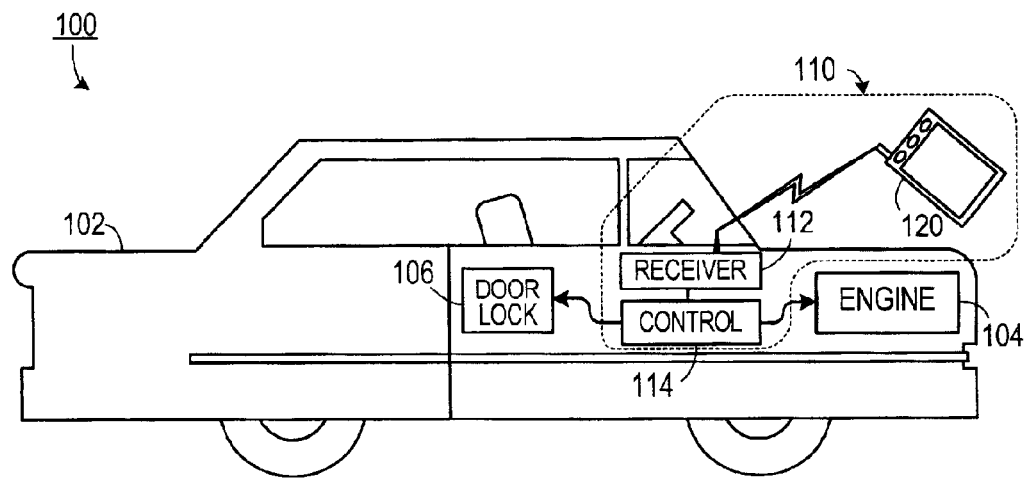
FIG. 1 is a schematic drawing of an illustrative embodiment of the invention, as applied to a single vehicle.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Figure 2:
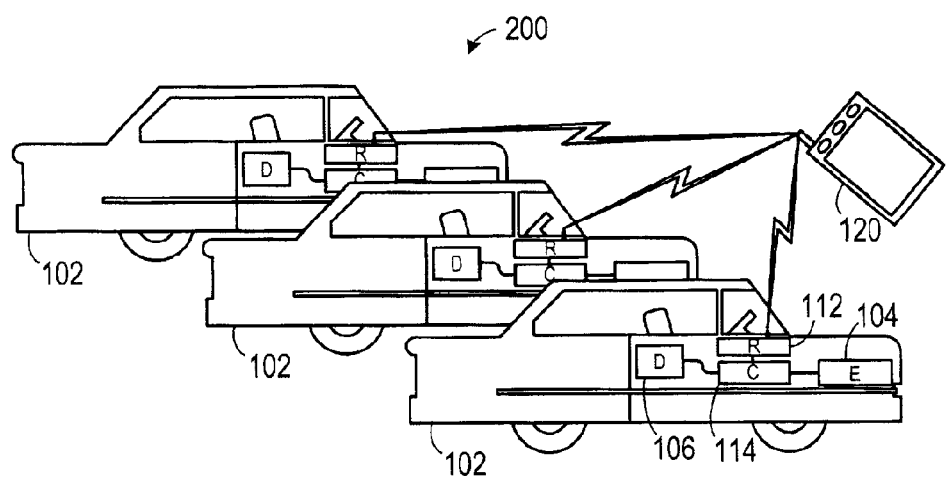
FIG. 2 is a schematic drawing of an illustrative embodiment of the invention, as applied to a plurality of vehicles.

As shown in FIG. 1, one embodiment of the invention 100 is a vehicle 102 that includes an engine 104 and an automatic door locking system 106. A removable door lock control apparatus 110 allows a salesperson at a dealership to control the door lock status. The removable door lock control apparatus 110 includes a signal sensor 112 and a control unit 114 that is responsive to the signal sensor 112. The signal sensor 112 is capable of receiving signals from a transmitter 120. The control unit 114 is capable of controlling the door locking system 106 so that when the signal sensor receives a predetermined signal (such as a specific code) from the transmitter 120, the control unit 114 causes the door locking system 106 to change the door lock state of at least one door of the vehicle 102. For example, if the door lock state for all doors of the vehicle is "locked," then the salesperson could activate the transmitter 120, thereby causing the door to become "unlocked." The control unit 114 may also be coupled to the engine 104 of the vehicle 102, so that upon changing the door lock state to "locked," the engine will be disabled, thereby providing a theft deterrent. As shown in FIG. 2, the door locks 106 of each vehicle 102 of a plurality of vehicles 200, such as at an automobile dealership, may be controlled by a single transmitter 120.

Typically, the keys for a vehicle 102 are locked in the vehicle 102, such a in the glove compartment, on the sales lot. When a customer wishes to take a test drive, the salesperson activates a transmitter 120, thereby unlocking at least one door of the vehicle 102 and the keys are retrieved from the glove compartment. Once the test drive is completed, the keys are returned to the glove compartment and the salesperson relocks the vehicle 102 by actuating the transmitter 120.

Several different types of receiver 112 may be employed. For example, the receiver 112 could be an infra-red sensor. An infra-red system has the advantages of low cost and high selectability. Thus, if a salesperson desires to open only one vehicle, the salesperson could apply the transmitter 120 to the window of the desired vehicle and only that vehicle would become unlocked. Another type of system that has high selectability is a capacitive coupling communication device. Several devices, in which the receiver 112 extends outside the vehicle 102 may be used. These include: a physical plug to which the salesperson attaches the transmitter 120; a magnetic strip reader that allows access when a salesperson applies a card with a magnetic strip (the card being the transmitter); a bar code reader (in which case a bar coded card is used as the transmitter); and even a biometric sensor, such as a finger print scanner. If the transmitter 120 emits a code that uniquely identifies the salesperson to which the transmitter 120 is assigned, then the system may keep an audit trail of each entry into the car by each salesperson, which may be useful in assessing employee habits. Generally, for broadcast-type receivers (e.g., infrared, radio frequency, etc.) the power level of the transmitter 120 should be low enough to require the transmitter 120 to be in close proximity to the vehicle 102 so that only one vehicle at a time will be responsive to the signal from the transmitter 120.

If the dealership wishes to be able to lock and unlock all of the vehicles simultaneously, then the receiver 112 could be a radio-frequency sensor. In such a case, the transmitter 120 could be a local radio-frequency transmitter, or could even be part of a satellite-based system (which could, for example, be activated by accessing a global computer network site).

Figure 3:
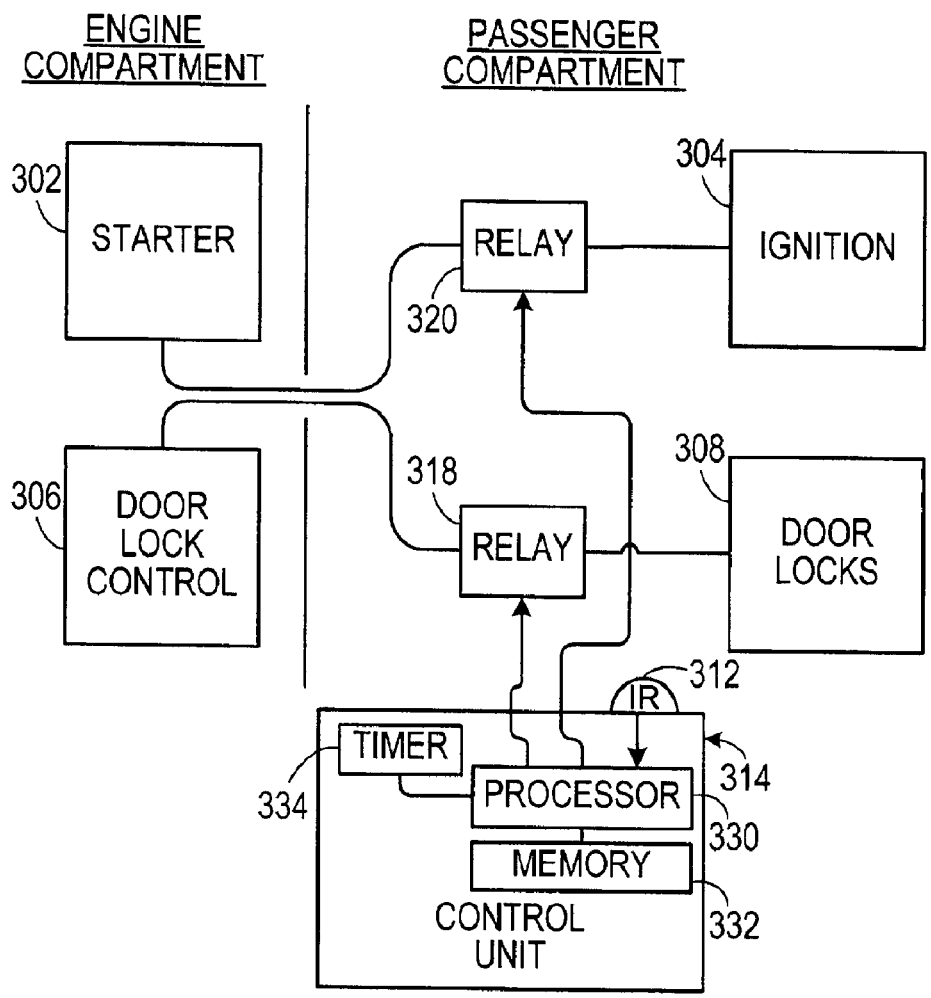
FIG. 3 is a block diagram of an embodiment of the invention that is applied to the ignition and door lock control systems of a vehicle.

As shown in FIG. 3, the control unit 314 may be coupled to the door locking control system of the vehicle by placing a first controllable switch 318, such as a relay, between the vehicle's installed door lock control unit 306 and the door lock actuator 308 inside the door panel of the vehicle. The first controllable switch 318, which is controlled by the control unit 314, may be controlled to apply power to the door lock actuator 308 to cause a change in state of the door lock. A second controllable switch 320 may be placed between the ignition 304 and the starter 302 to disable the starter 302. The control unit 314 keeps track of the locked state of the door lock and disables the starter 302 whenever the door lock is in the locked state. The control unit 314 could include a processor 330 such as a dedicated microprocessor, a programmable logic controller or any one of the many other types of programmable controllers that are generally known in the art of electronic control circuit design.

When a salesperson leaves the dealership, the codes to which the control unit 314 responds must be changed. This may be done by inputting a supervisor code to the signal sensor 312, or through a separate dedicated data entry port (which could be a hard wired port connected to the control unit 314). The supervisor code is compared to the data in a first memory location in the processor memory 332 and, if they match, then the user is able to input a new code into a second memory location in the processor memory 332. The code in the second memory location is the code to which the control unit will respond for changing the door lock states. The supervisor code and the new code could also be input through a separate receiver, such as a radio-frequency receiver, with the new code being input to a plurality of vehicles simultaneously.

Occasionally, the salesperson will forget to relock a door after taking a customer on a test drive. Therefore, the control unit 314 may be programmed to include a timer 334 that counts a predetermined amount of time from the last time that the door was unlocked. After the expiration of the predetermined time, if the vehicle has been inactive, the control unit 314 will cause the doors of the vehicle to lock and the starter to become disabled.

Figure 4:
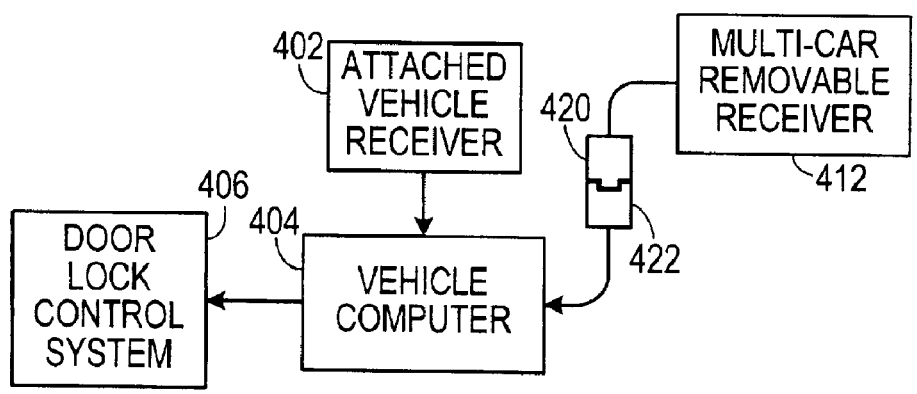
FIG. 4 is a block diagram of an embodiment of the invention that is applied to a dedicated port of a computer used to control certain features of a vehicle.

An installed system is shown in FIG. 4, in which the invention is embedded in the on-board computer system 404 of the vehicle. In this embodiment, the computer system 404 already controls the door lock control system 406 so that only an additional data port 422 need be added to the computer system 404. The data port 422 is coupled to a multi-car removable receiver 412 while the vehicle is at the dealership. Once the vehicle is sold, the multi-car removable receiver 412 is unplugged from the data port 422.

The vehicle may also come with an attached vehicle receiver 402 that allows operation of a keyless entry system by the end user. Therefore, the computer system 404 must be programmed to recognize the difference between a keyless entry system activation code entered through the attached vehicle receiver 402 and a dealership code received by the multi-car removable receiver 412. The computer system 404 may also be programmed to deactivate the attached vehicle receiver 402 when the multi-car removable receiver 412 is in use.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. An apparatus for controlling a door lock of a vehicle having an automatic door locking circuit, comprising
   a. a signal sensor;
   b. a removable control unit, responsive to the signal sensor, that generates a door lock state change signal when the signal sensor receives a signal having a first predetermined code value; and
   c. a first controllable switch, responsive to the removable control unit, that is removably couplable to the automatic door locking circuit so as to be able to override the automatic door locking circuit so that when the door lock state change signal is asserted, the controllable switch applies power to the automatic door locking circuit, thereby causing a change of state of the door lock.

2. The apparatus of claim 1, wherein the signal sensor comprises an infrared sensor.

3. The apparatus of claim 1, wherein the signal sensor comprises a bar code reader.

4. The apparatus of claim 1, wherein the signal sensor comprises a biometric sensor.

5. The apparatus of claim 4, wherein the biometric sensor comprises a finger print scanner.

6. The apparatus of claim 1, wherein the signal sensor comprises a radio-frequency sensor.

7. The apparatus of claim 1, wherein the vehicle has an ignition system, the apparatus further comprising a second controllable switch that is removably couplable to the ignition system and that is responsive to the removable control unit, the second controllable switch capable of disabling the ignition system when the removable control unit indicates that the door lock is in a locked state.

8. The apparatus of claim 1, wherein the removable control unit comprises:
   a. a timer that is capable of incrementing a timer value at a regular interval when the timer is started;
   b. a timer control circuit that starts the timer when the removable control unit causes the door lock to enter an unlocked state; and
   c. a timed locking circuit that causes the door lock to enter a locked state when the timer value reaches a predetermined value.

9. The apparatus of claim 1, wherein the removable control unit comprises:
   a. a first memory location that stores a supervisor code; and
   b. a second memory location that stores the first predetermined code, wherein the removable control unit is programmed to allow the second memory to store a new code value when the supervisor code is entered into the removable control unit.

10. The apparatus of claim 9, wherein the removable control unit further comprises a data plug through which the supervisor code and the new code may be transmitted to the removable control unit.

11. The apparatus of claim 9, wherein the removable control unit further comprises a radio frequency receiver through which the supervisor code and the new code may be transmitted to the removable control unit.

12. The apparatus of claim 9, wherein the supervisor code and the new code are transmitted to the removable control unit through the signal sensor.

13. An apparatus for controlling a door lock of each of a plurality of vehicles, each vehicle having an automatic door locking circuit, the apparatus comprising:
   a. a transmitter capable of transmitting a common predetermined code; and
   b. a plurality of removable controllers, wherein each controller comprises:
      i. a signal sensor;
      ii. a removable control unit, responsive to the signal sensor, that generates a door lock state change signal when the signal sensor receives a signal having the common predetermined code value; and
      iii. a first controllable switch, responsive to the removable control unit, that is removably couplable to the automatic door locking circuit so as to be able to override the automatic door locking circuit so that when the door lock state change signal is asserted, the controllable switch applies power to the automatic door locking circuit, thereby causing a change of state of the door lock.

14. The apparatus of claim 13, wherein the transmitter comprises an infrared code transmitter.

15. The apparatus of claim 13, wherein the transmitter comprises a radio frequency code transmitter.

16. The apparatus of claim 13, wherein the signal sensor comprises an infrared sensor.

17. The apparatus of claim 13, wherein the signal sensor comprises a radio frequency sensor.

18. The apparatus of claim 13, wherein each vehicle has an ignition system, the apparatus further comprising a second controllable switch that is removably couplable to the ignition system and that is responsive to the removable control unit, the second controllable switch capable of disabling the ignition system when the removable control unit indicates that the door lock is in a locked state.

19. The apparatus of claim 13, wherein the removable control unit comprises:
   a. a timer that is capable of incrementing a timer value at a regular interval when the timer is started;
   b. a timer control circuit that starts the timer when the removable control unit causes the door lock to enter an unlocked state; and
   c. a timed locking circuit that causes the door lock to enter a locked state when the timer value reaches a predetermined value.

20. The apparatus of claim 13, wherein the removable control unit comprises:
   a. a first memory location that stores a supervisor code; and
   b. a second memory location that stores the common predetermined code, wherein the removable control unit is programmed to allow the second memory to store a new code value when the supervisor code is entered into the removable control unit.

21. The apparatus of claim 20, wherein the removable control unit further comprises a data plug through which the supervisor code and the new code may be transmitted to the removable control unit.

22. The apparatus of claim 20, wherein the removable control unit further comprises a radio frequency receiver through which the supervisor code and the new code may be transmitted to the removable control unit.

23. The apparatus of claim 20, wherein the supervisor code and the new code are transmitted to the removable control unit through the signal sensor.

* * * * *